United States Patent Office.

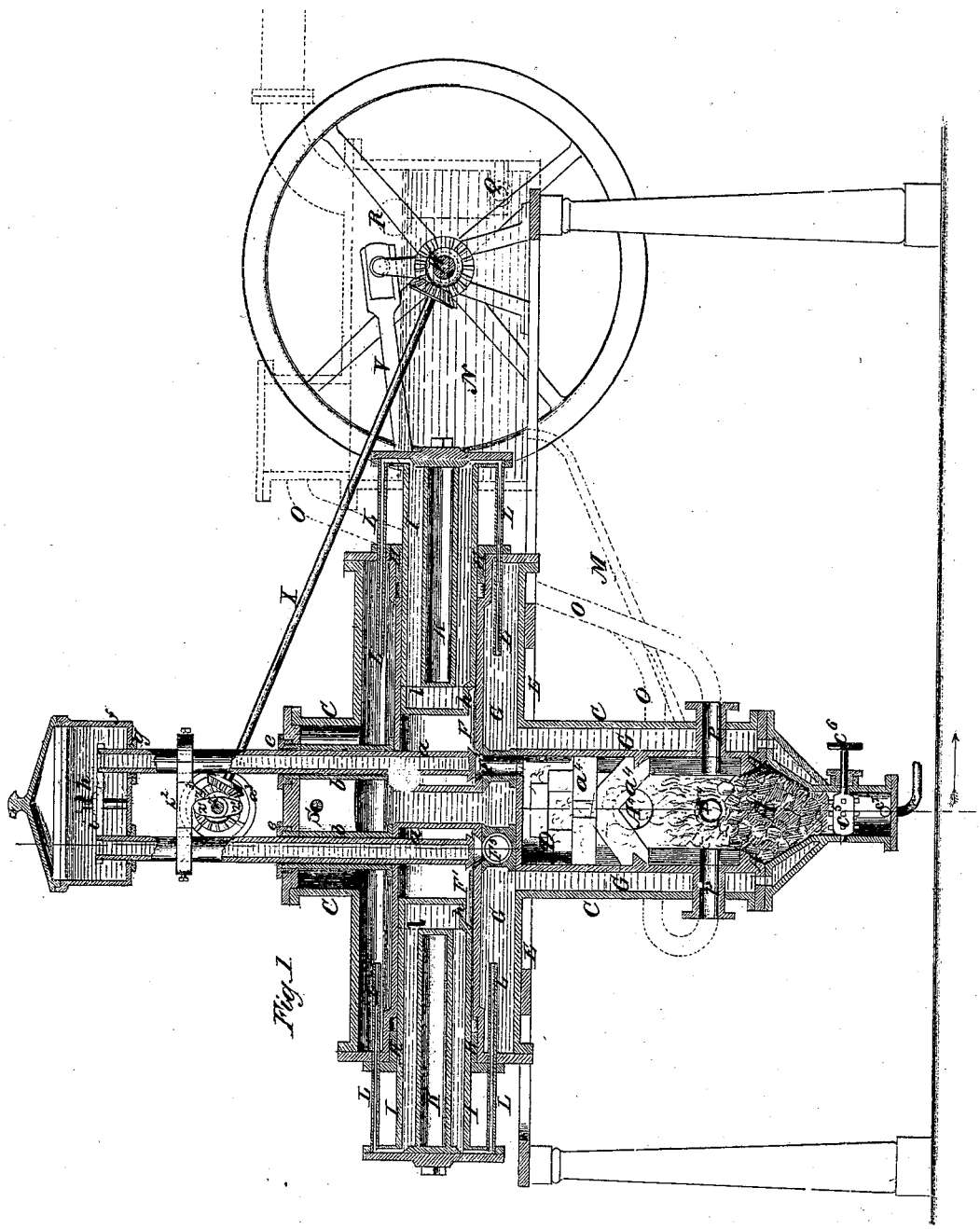
A. HENDRY.
STEAM AND CALORIC ENGINE.
No. 98,061.  Patented Dec. 21, 1869.

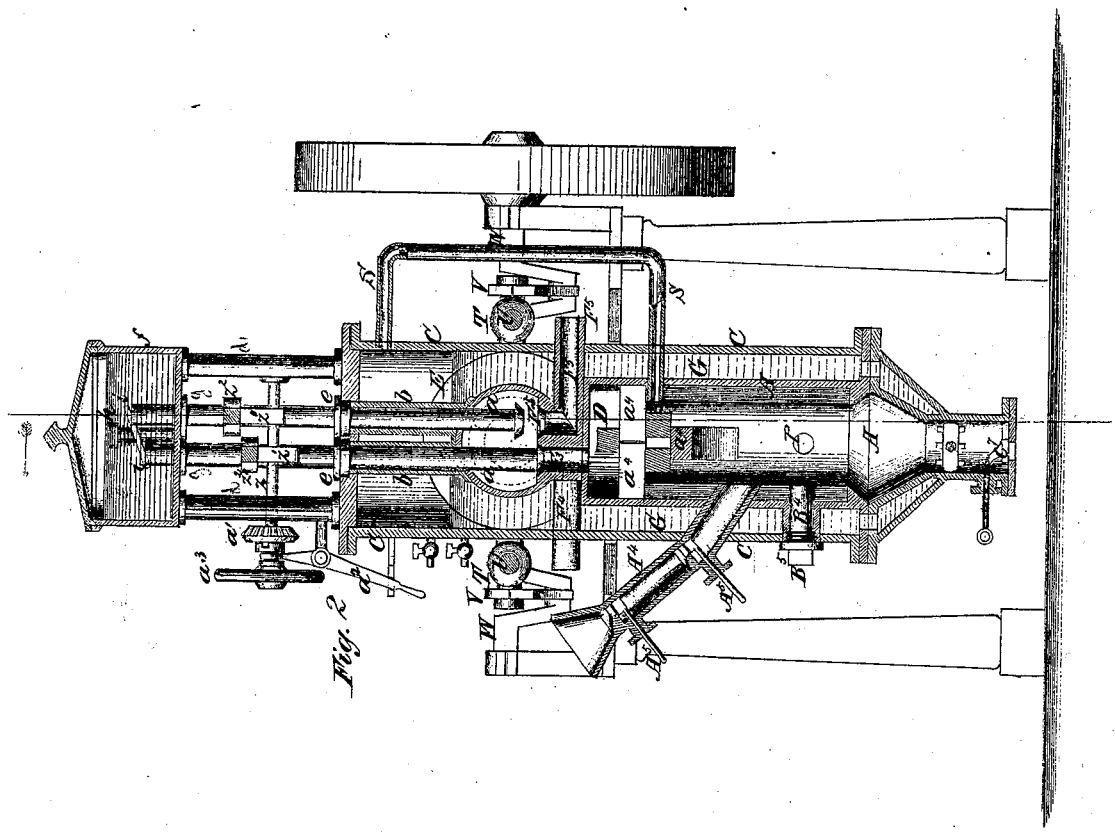

ALEXANDER HENDRY, OF VICTORIA, BRITISH COLUMBIA.

Letters Patent No. 98,061, dated December 21, 1869.

STEAM AND CALORIC-ENGINE.

The Schedule referred to in these Letters Patent and making part of the same.

*To all whom it may concern:*

Be it known that I, ALEXANDER HENDRY, of Victoria, in the Province of British Columbia, have invented a new and useful Improvement in Steam and Caloric-Engines; and I do hereby declare that the following is a full, clear, and exact description thereof, which will enable others skilled in the art to make and use the same, reference being had to the accompanying drawings, forming part of this specification.

This invention relates to improvements in engines for obtaining power by heat, and is designed to provide a means of utilizing the power of the gases given off by combustion, either alone or in connection with steam generated at the same time, and superheated and mixed with the said gases.

The invention consists in an improved arrangement of jacketed cylinders and jacketed furnace, constituting a water-space for generating steam, by the radiating heat of the furnace, and arranged to envelop the cylinders with water to prevent injury by the gases and heat.

Also, an improved arrangement of chambered pistons, for keeping the same filled with water to counteract the action of the heat upon the same.

Also, certain improvements in chambered valves, rods, and valve-operating devices, the said chambered valves and rods being supplied with water, also to prevent injury by the heat and the gases.

Figure 1 represents a longitudinal sectional elevation of my improved engine; and Figure 2 represents a transverse section of the same.

Similar letters of reference indicate corresponding parts.

A represents an enclosed furnace, preferably of cylindrical form above the coal-space, vertical in position, and of sufficient height in the chamber B, to produce the best results in combustion.

This furnace is surrounded by a vertical jacket, C, which is pendent from the centre of a horizontal jacket, E, supported in any suitable way, and enclosing the cylinders F F$^1$, providing a water-space, G, surrounding both the furnace and the cylinders, one in each end of the jacket E, and provided with packing-glands E, at the ends of the jacket, where they open through the heads thereof.

I represents hollow pistons, one for each cylinder, and provided with chambers K, for taking up as much of the central space as it is not needful should be occupied by water.

The pistons have tubes L, leading from the water-space of the jacket E to the interior, keeping a constant communication and circulation of water in the pistons. The said pipes work through stuffing-boxes in the ends of the jackets E.

The water is supplied to the jacket C by a pipe, M, leading from a supply-tank, shown in dotted lines, and the air is supplied to the furnace from the same tank by pipes leading from the top to the tuyeres P.

The water and air are supplied to this tank by a pump, in any suitable way.

The level of the water in the jackets C and E is intended to be governed by the height in this tank; and to regulate it here, an escape-valve, Q, and float R, are provided, which open the passage when the water rises too high.

The steam generated in the jackets is conducted by a pipe, S, from the steam-space, in the upper extension of the jacket C, into the combustion-chamber B, where it is superheated, and from which it is admitted alternately, by valves F$^2$ and F$^3$, to the cylinders, F and F$^1$, respectively, and exhausted similarly by the valves F$^4$ and F$^5$, through the lateral pipes F$^6$ and F$^7$.

These supply and exhaust-valves are attached to hollow stems or rods $a$, rising up through the cylinders, pipes $b$, in the jacket C, packing-glands $d$, above and into an elevated water-tank $e$, supported in pillars $f$, resting on the top of the jacket C. Glands $g$ are also provided in the bottom of this tank.

The rods have spring-pressure applied at the top ends, by a spring, $h$, and bar $i$, to counteract the upward pressure on the valves.

In this way the valve-rods are provided with a circulation of water to protect them from the heat.

The inner ends of the pistons are recessed, as shown at $k$, and in dotted lines at $l$, to provide room for the valve-rods, which pass through the cylinders.

The pistons are connected at their outer ends to cross-heads T, which are connected, by rods U, working in guides on the sides of the jacket E, and carrying connecting-rods V, one on each side, which are connected to the crank-shaft W.

From this shaft an inclined shaft, X, turned by suitable bevel-gears, is arranged for working the cam-shaft Z, which has a pair of cams, Z$^1$, set opposite to each other, so that one set of valves will be raised, while the other is at rest, by acting on the wipers Z$^2$ of the valve-stems.

These wipers have tappets Z$^3$, which I propose to arrange so as to be movable on them from one side to the other of the cam-shaft, for varying the point of cutting off, and for reversing the movement of the engine.

When set on one side of the cam-shaft, the engine will run one way, and when set on the other side, the motion will be reversed, and the change of position on either side, to or from the shaft, varies the point of cutting off. The said tappets may, however, be made fast to the said wipers.

The wipers Z$^2$ are connected to the stem of one supply and one exhaust-valve.

In order to insure the seating of each valve independently of the other, the said wipers may be made in two parts, one lapping over the other, to be raised by it.

The bevel-wheel $a^1$, on the cam-shaft Z, is made to slide into or out of gear with the corresponding wheel on the shaft, connecting it with the driving-shaft, and has a hand-lever, $a^2$, for moving it. The machine is stopped by sliding this wheel out of gear, and started by turning the hand-wheel $a^3$, for setting the valves in motion, and gearing it with the other wheel.

Fire-bricks, $a^4$, are arranged in the upper part of the fire-chamber, in a way to break and divide the flame, for the better combination of the oxygen of the air, to produce the best effects in combustion, the said bricks being laid across and above each other, with spaces between, having abrupt turns.

The coal may be supplied to the furnace through a tube, $A^4$, having a funnel-mouth, and two cut-off valves or slides, $A^5$, one of which may be kept closed, while the coal is passing the other, to prevent the escape of the steam and gas.

$B^4$ represents a tube, through which to light the fire; it is stopped by a screw-plug, $B^5$.

A small tube may be provided for looking in, to see the condition of the fire, having a glass to prevent the escape of steam and gas.

$C^5$ is a revolving grate, below the fire, with a projecting shaft through a stuffing-box, and a band-wheel, $C^6$, outside, for revolving it, to discharge the ashes and cinders.

Below the grate is an ash-pit and valve, $C^7$, for removing the ashes.

The power may be regulated by the quantity of air admitted to the fire, which, as above stated, is forced in by a pump, deriving motion from the engine in any preferred way.

I propose, in some cases, to make use of liquid fuel, and to modify the arrangement of the furnace for such fuel as may be found best.

The pistons may be used without the chambers $k$, if preferred.

I propose to operate this improved engine with air, forced into the heater, and therein rarefied, and the gases of combustion together, or with the same, and the steam generated in the jackets.

When the steam is not used, the temperature will not be sufficient to generate steam.

Having thus described my invention,

I claim as new, and desire to secure by Letters Patent—

1. The combination of the furnace, the vertical and horizontal water-jackets, and the cylinders $F\ F^1$, when the latter are provided with induction-ports, leading from the combustion-chamber, to which the steam is first conducted and superheated, and exhaust-ports, and when the said jackets provide water and steam-spaces around the furnace and cylinders, substantially as specified.

2. The combination, with the water-jacketed cylinders, of the hollow pistons, whether provided with chambers $k$ or not, when the said hollow pistons have pipes communicating with the water-space G, and maintaining a circulation in the said pistons, substantially as specified.

3. The combination, with the valves for the induction and exhaust-ports, of the hollow stems $a$ and water-supply tank, substantially as specified.

4. In combination with the hollow stems $a$, the induction and exhaust-valves, and combustion-chambers B, the cam-shaft Z, cams $Z^1$, wipers $Z^2$, and tappets $Z^3$, the latter either adjustable or not, when said parts are arranged substantially as herein shown and described, and for the purpose specified.

The above specification of my invention signed by me, this    day of    , 1869.

Witnesses:     ALEXANDER HENDRY.
GEORGE PEARKES,
GEO. HEMINGWAY.